US006915892B2

United States Patent
Bauer et al.

(10) Patent No.: US 6,915,892 B2
(45) Date of Patent: Jul. 12, 2005

(54) DRIVING PLATE FOR MULTI-PLATE CLUTCH SYSTEM

(75) Inventors: Karl-Heinz Bauer, Graben-Neudorf (DE); Frank Guenter, Karlsruhe (DE); Johannes Heinrich, Friedrichsdorf (DE); Robert Weiss, Schwetzingen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/462,140

(22) Filed: Jun. 16, 2003

(65) Prior Publication Data

US 2004/0055842 A1 Mar. 25, 2004

(30) Foreign Application Priority Data

Jun. 15, 2002 (EP) ............................................. 02013205

(51) Int. Cl.$^7$ .............................................. F16D 13/68
(52) U.S. Cl. .................. 192/207; 74/409; 192/30 V; 192/70.17; 192/70.2
(58) Field of Search ............................. 192/70.2, 70.17, 192/200, 207, 30 V; 74/409, 449, 461

(56) References Cited

U.S. PATENT DOCUMENTS

| | | | | |
|---|---|---|---|---|
| 1,467,732 A | * | 9/1923 | Litle, Jr. ..................... | 192/207 |
| 1,518,604 A | * | 12/1924 | Rosner ...................... | 192/70.2 |
| 2,968,381 A | * | 1/1961 | Vosler ....................... | 192/70.2 |
| 3,245,508 A | * | 4/1966 | Livezey ................... | 192/70.17 |
| 3,803,872 A | | 4/1974 | Wolf | |
| 4,889,206 A | * | 12/1989 | Wiese et al. ................ | 180/248 |
| 5,054,596 A | * | 10/1991 | Taureg et al. .............. | 192/70.2 |
| 5,653,321 A | * | 8/1997 | Takaoka et al. ........... | 192/70.2 |
| 5,979,627 A | * | 11/1999 | Ruth et al. ................ | 192/70.17 |
| 5,992,597 A | * | 11/1999 | Nagai et al. ............... | 192/70.2 |
| 6,210,280 B1 | | 4/2001 | Nagano et al. | |
| 6,397,997 B2 | | 6/2002 | Kato | |
| 6,695,114 B2 | * | 2/2004 | Helmstadter et al. ...... | 192/70.2 |

FOREIGN PATENT DOCUMENTS

| | | | |
|---|---|---|---|
| GB | 2 275 318 A | * | 8/1994 |
| JP | 5-272549 A | * | 10/1993 |

* cited by examiner

Primary Examiner—Rodney H. Bonck
(74) Attorney, Agent, or Firm—Bliss McGlynn, P.C.; Greg Dziegielewski

(57) ABSTRACT

A driving plate for a multi-plate clutch system includes a plurality of external teeth adapted to be matingly engaged within corresponding internal teeth of a housing of the clutch system. The external teeth are disposed substantially equidistantly along the circumference of the driving plate. At least one tooth of the external teeth is disposed offset in the circumferential direction from adjacent external teeth.

9 Claims, 4 Drawing Sheets

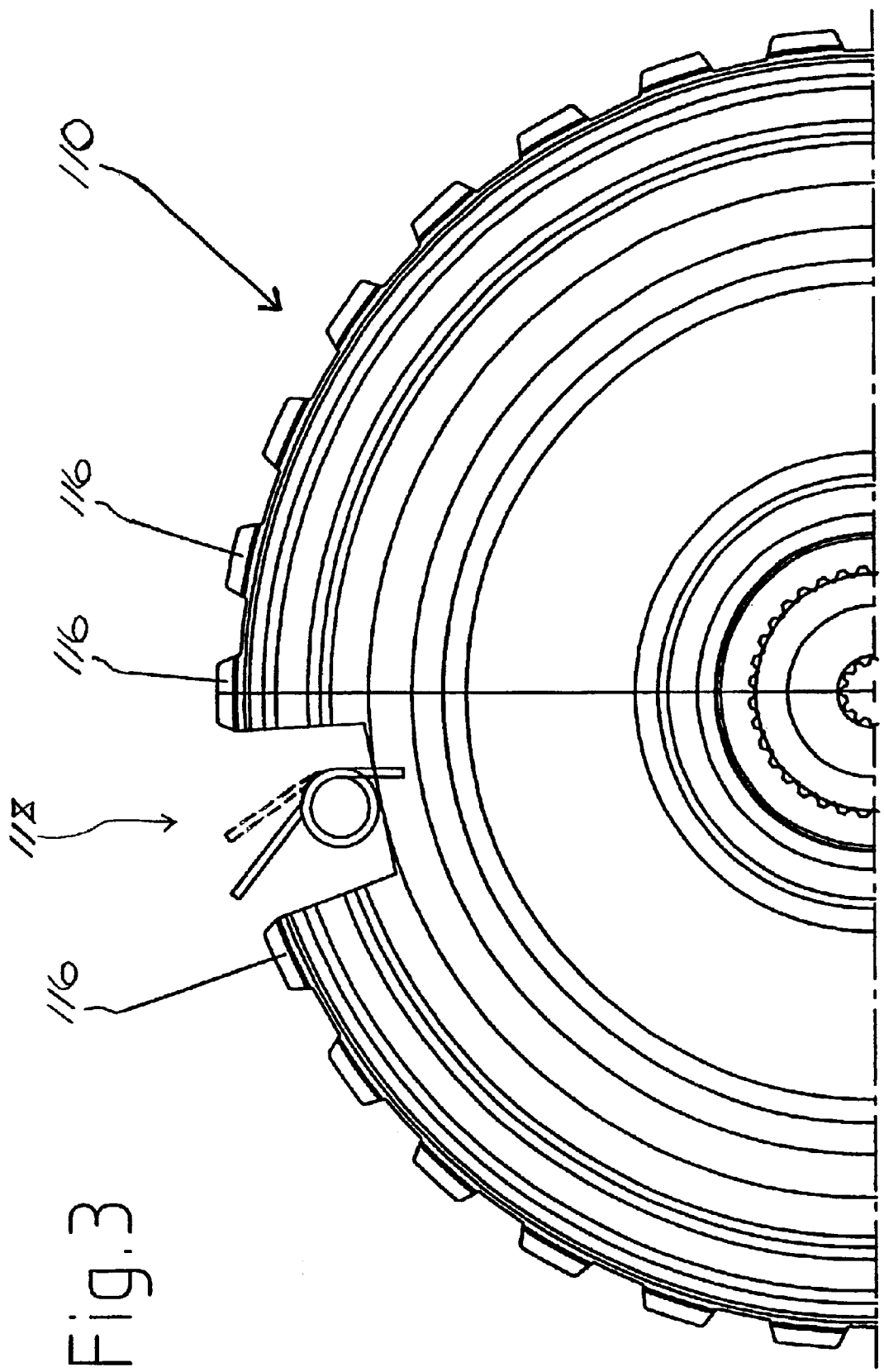

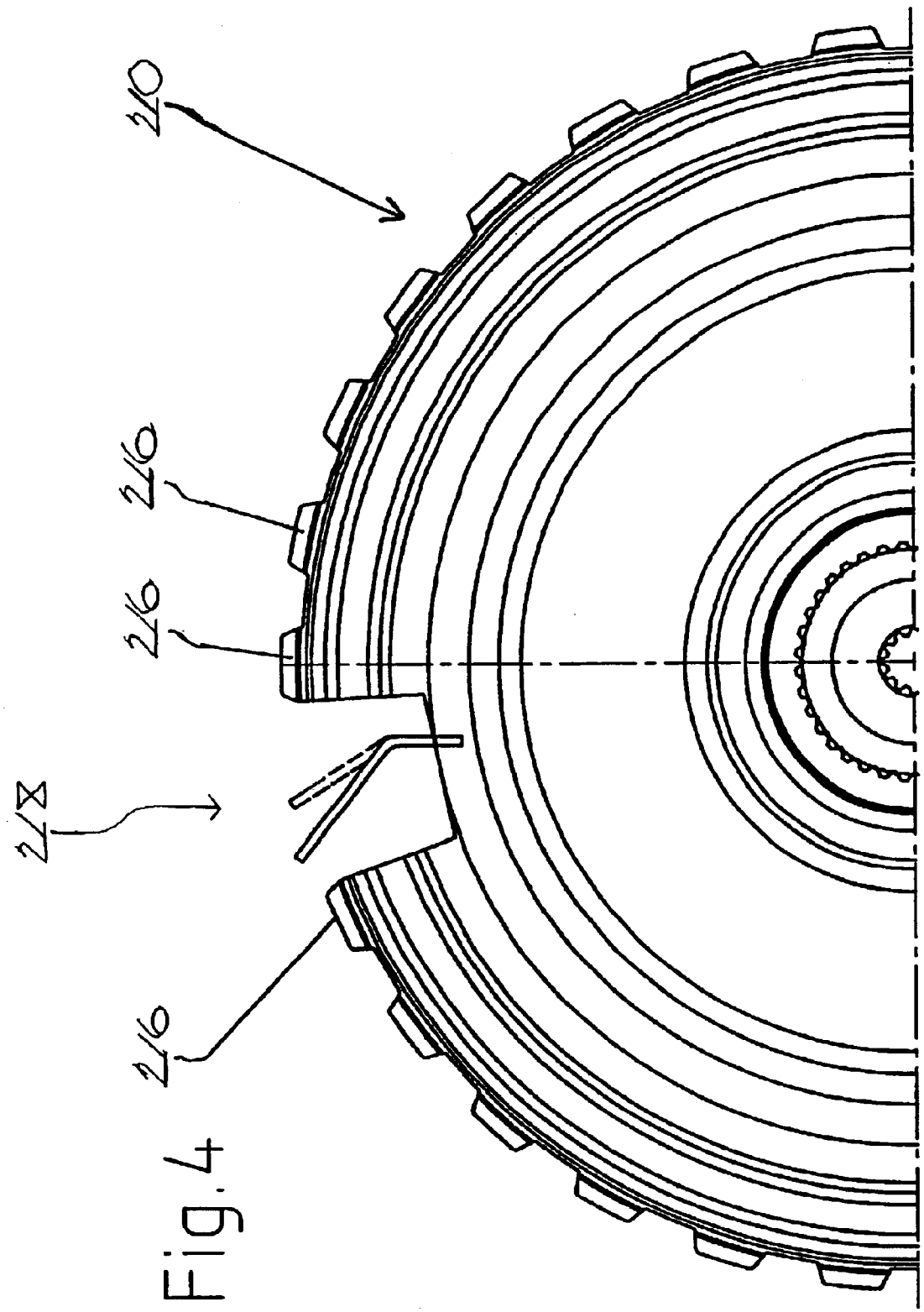

DRIVING PLATE FOR MULTI-PLATE CLUTCH SYSTEM

BACKGROUND OF THE INVENTION

1. Field of the Invention

The present invention relates, generally, to a multi-plate clutch system and, particularly, to a driving plate for such a system.

2. Description of the Related Art

The drive connection of a multi-plate clutch system—in particular, a double-plate clutch system—typically employs a driving plate. The driving plate has external teeth that are matingly inserted into internal teeth of a housing of the clutch system. One disadvantage of the driving plate of the related art is that backlash of the teeth and vibration excitation due to rotational irregularity of an internal-combustion engine, for example, can cause clattering noises. The clattering noises occur especially when the engine is idling due to changing of flanks of the teeth within the backlash. Diesel engines, in particular, have an increased tendency toward vibration excitation.

Thus, there remains a need in the art for a driving plate for a multi-plate clutch system that does not cause clattering noises or, at least, reduces the volume thereof.

SUMMARY OF THE INVENTION

The present invention overcomes the disadvantages in the related art in a driving plate for a multi-plate clutch system including a plurality of external teeth adapted to be matingly engaged within corresponding internal teeth of a housing of the clutch system. The external teeth are disposed substantially equidistantly along the circumference of the driving plate. At least one tooth of the external teeth is disposed offset in the circumferential direction from adjacent external teeth.

One advantage of the driving plate for a multi-plate clutch system of the present invention is that it does not cause clattering noises or, at least, reduces the volume of this type of noise.

Another advantage of the driving plate of the present invention is that it reduces backlash of the driving plate in the housing.

Another advantage of the driving plate of the present invention is that it reduces wear.

Another advantage of the driving plate of the present invention is that the teeth lock.

Another advantage of the driving plate of the present invention is that it prevents separation of the teeth from each other when the loads are changing.

Another advantage of the driving plate of the present invention is that it allows for simple bracing of the external teeth with the internal teeth.

Another advantage of the driving plate of the present invention is that it can be simply manufactured in the form of a stamped sheet-metal part.

Another advantage of the driving plate of the present invention is that any clattering noises can be completely suppressed when the clutch system is running at an idle.

Another advantage of the driving plate of the present invention is that it permits for a normal operation of the clutch system that has low parasitic losses and low wear.

Other objects, features, and advantages of the present invention will be readily appreciated as the same becomes better understood while reading the subsequent description taken in conjunction with the accompanying drawings.

BRIEF DESCRIPTION OF THE DRAWINGS

FIG. 3 is a partial top view of a second embodiment of the driving plate for a multi-plate clutch system of the present invention showing the external teeth of the driving plate.

FIG. 4 is a partial top view of a third embodiment of the driving plate for a multi-plate clutch system of the present invention showing the external teeth of the driving plate.

DETAILED DESCRIPTION OF THE INVENTION

Figure 1:
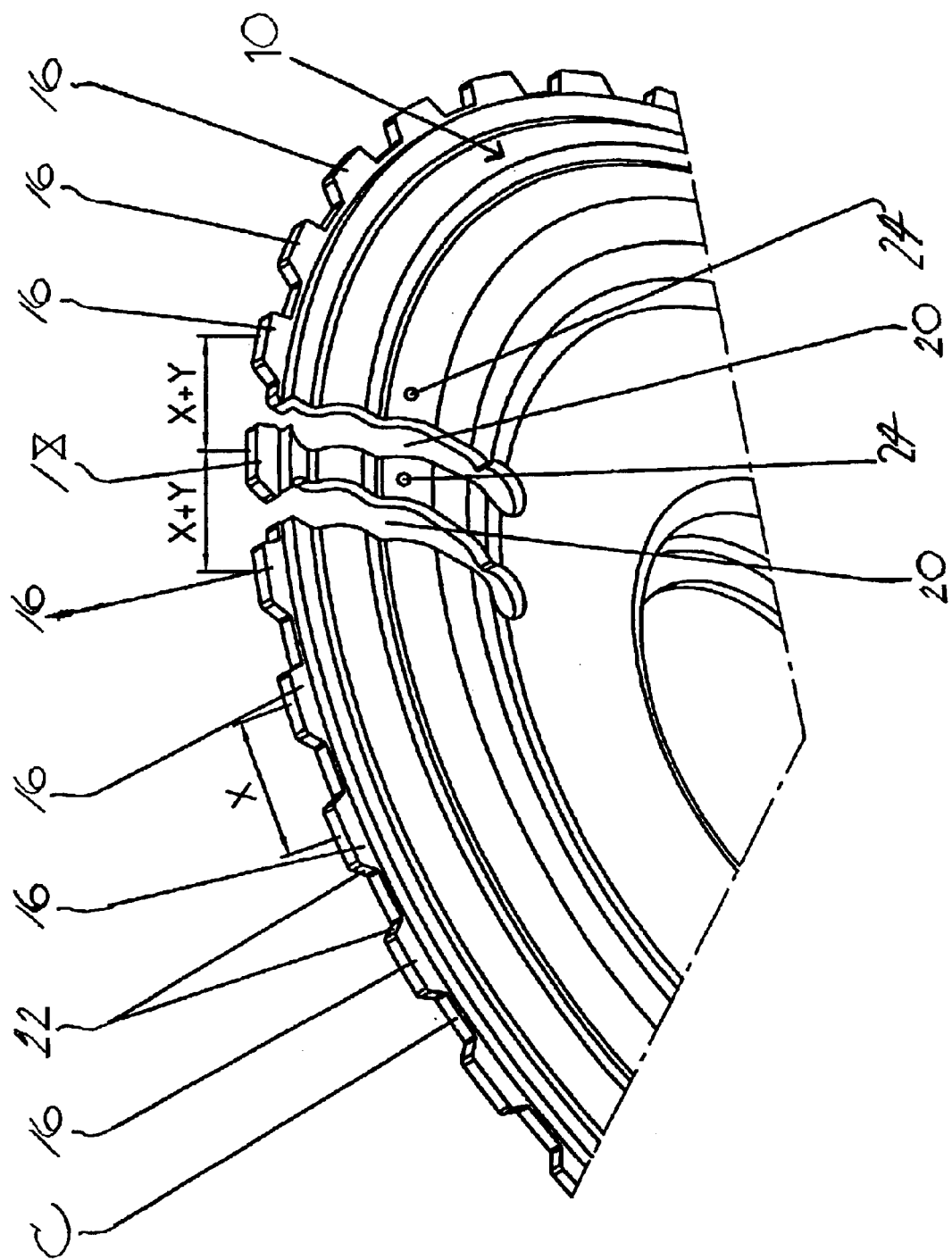
FIG. 1 is a partial perspective view of a first embodiment of the driving plate of the present invention showing the external teeth of the driving plate.
Figure 2B:
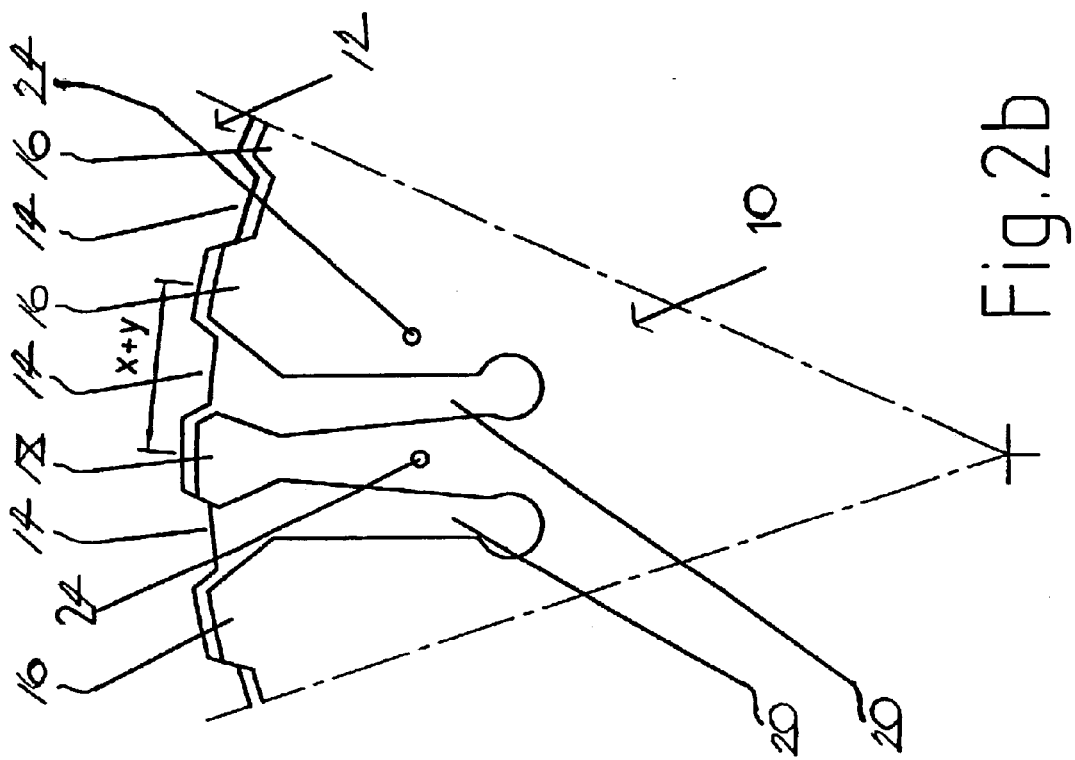
FIG. 2b is another partial top sectional view of the first embodiment of the driving plate of the present invention showing the external teeth of the driving plate disposed in the internal teeth of the housing of the clutch system.

Referring now to FIGS. 1 through 2b, where like numerals are used to designate like structure, a first embodiment of a driving plate for a multi-plate clutch system of the present invention is generally indicated at 10. The driving plate 10 is designed to be used with a clutch system of a known type that includes a housing, generally indicated at 12, and a plurality of internal teeth 14 formed within the housing 12. Although use of the driving plate 10 creates a drive connection of a double-plate clutch system, in particular, those having ordinary skill in the art will appreciate that use of the driving plate 10 can create a drive connection of a clutch system having more than two plates.

The driving plate 10 generally includes a plurality of external teeth 16 adapted to be matingly engaged within corresponding internal teeth 14. The external teeth 16 are disposed substantially equidistantly along the circumference "C" of the driving plate 10. At least one tooth 18 of the external teeth 16 is disposed offset in the circumferential direction from adjacent external teeth 16.

Figure 2A:
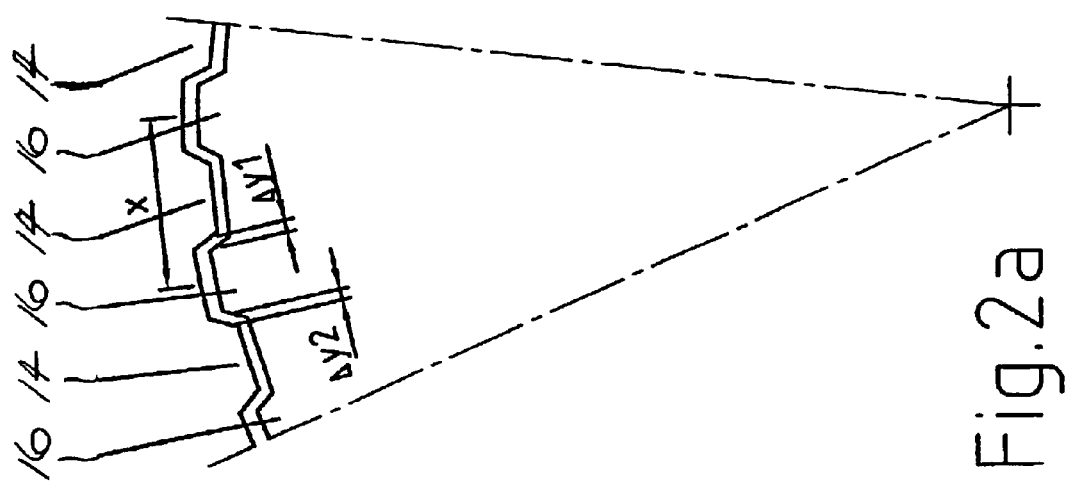
FIG. 2a is a partial top sectional view of the first embodiment of the driving plate of the present invention showing the external teeth of the driving plate disposed in the internal teeth of the housing of the clutch system.

More specifically and still referring to FIGS. 1 through 2b, the driving plate 10 is substantially rotationally symmetric and constructed as a stamped sheet-metal part. The external teeth 16 engage the internal teeth 14 to enable the driving connection of the clutch system. As shown in FIG. 2a, the external teeth 16 mesh with radial backlash "$\Delta y_1 + \Delta y_2$" into intermediate spaces of adjacent internal teeth 14. The midpoint of an external tooth 16 is separated by a distance "X" from the midpoint of each of adjacent external teeth 16. Preferably, only one tooth 18 is disposed offset in the circumferential direction from adjacent external teeth 16 by an additional distance "Y." The midpoint of the one tooth 18, therefore, is disposed from the midpoint of each of the adjacent external teeth 16 by a distance "X+Y."

The driving plate 10 is inserted into the clutch housing 12 such that the one tooth 18 is disposed offset in the direction of a pushing force acting on the driving plate 10. As such, all the teeth 14, 16 connected with each other are also held pressed against each other by the internal and external teeth 14, 16, respectively, so that the loads cancel each other out. A separation from each other when the loads are changing is, thus, prevented.

The tooth 18 is disposed offset by at least the distance of a maximum circumferential backlash. This measure is the minimum requirement for the possibility of elimination of clattering noises. Preferably, the distance "Y" is selected to exceed the distance of the maximum circumferential backlash "$\Delta y_1 + \Delta y_2$."

The tooth 18 is elastic in the circumferential direction. The elasticity of the tooth 18 permits for simple bracing of the external teeth 16 with the internal teeth 14. More specifically, at least one indentation 20, but, preferably, two indentations 20, is disposed radially in the driving plate 10 and separates the tooth 18 from the adjacent external teeth 16. With the indentation 20, the driving plate 10 can be simply manufactured in the form of a stamped sheet-metal part. The degree of elasticity of the one tooth 18 can be simply selected by the depth of the separating indentations 20.

In connection with the distance "Y" that exceeds the distance of the maximum circumferential backlash "$\Delta y_1 + \Delta y_2$," pretensioning results between the external teeth 16 and the internal teeth 14. The pretensioning is preferably selected large enough such that it supports an idling alternating moment of force. As a result, any clattering noises can be completely suppressed when the clutch system is running at an idle.

In normal operation of the clutch system, the distance "Y" in the direction of the pushing force acting on the driving plate 10 causes flanks 22 of the external teeth 16 to be substantially tightly fitted on corresponding flanks of the internal teeth 14 when the moment of pushing force is greater than the portion of the moment of pushing force when the clutch system is operating at an idle. Thus, a normal operation is possible that enjoys a low level of losses and low wear. In its operative mode, the tooth 18 can enable a tight-fitting on the flanks 22 via the elasticity of the one tooth 18 if the pushing force is greater than the portion of the pushing force when the clutch system is operating at an idle.

To make it easier to matingly dispose the external teeth 16 within the corresponding internal teeth 14, the driving plate also includes an assembly aid 24. The assembly aid preferably includes an access opening 24 defined in the tooth 18 and disposed substantially in a radial direction. An access opening 24 is also defined by one of the adjacent external teeth 16 and disposed substantially in a radial direction. Ends of tongs or the like can be inserted into the access openings 24. By closing the tongs, the distance "Y" can be reduced such that insertion of the external teeth 16 into the internal teeth 14 is possible. In fact, the tooth 18 can be pressed against an adjacent external tooth 16. The assembly aid 24 is especially necessary if the driving plate 10 must be inserted into the clutch housing 12 under increased pretensioning.

Since the driving plate 10 is in the form of a stamped sheet-metal part, the elastic action of the tooth 18 is limited. To improve the pretensioning function, instead of the tooth 18, a spring device can be provided.

As such and referring now to FIG. 3, where like numerals increased by 100 are used to designate structure like that of FIGS. 1–2b, a second embodiment of a driving plate for a multi-plate clutch system of the present invention is generally indicated at 110. The driving plate 110 generally includes a plurality of external teeth 116 adapted to be matingly engaged within corresponding internal teeth 14 and disposed substantially equidistantly along the circumference of the driving plate 110. A flat spiral spring, generally indicated at 118, is disposed offset in the circumferential direction from adjacent external teeth 116.

More specifically, the elastic force of the flat spiral spring 118 acts on the circumference in the circumferential direction. The flat spiral spring 118 can mesh into the intermediate space of adjacent inner teeth 14 and cause tensioning of the driving plate 110 relative to the housing 12 in the circumferential direction. To demonstrate the elastic action of the flat spiral spring 118, the flat spiral spring 118 is shown in FIG. 3 in both a relaxed state and a tensioned state.

Referring now to FIG. 4, where like numerals increased by 200 are used to designate structure like that of FIGS. 1–2b, a third embodiment of a driving plate for a multi-plate clutch system of the present invention is generally indicated at 210. The driving plate 210 generally includes a plurality of external teeth 216 adapted to be matingly disposed within corresponding internal teeth 14 and disposed substantially equidistantly along the circumference of the driving plate 210. A leaf spring, generally indicated at 218, is disposed offset in the circumferential direction from adjacent external teeth 216. To demonstrate the elastic action of the leaf spring 218, the leaf spring 218 is shown in FIG. 4 in both a relaxed state and a tensioned state.

With the driving plates 110, 210, individual teeth can be inserted separately and connected so that they are movable or have a very small rigidity in the circumferential direction. The teeth can then, in turn, be pretensioned with the spring device 118, 218. Preferably, the spring device 118, 218 includes a tooth disposed on the circumference of the driving plate 110, 210.

The driving plate 10, 110, 210 does not cause clattering noises or, at least, reduces the volume thereof, reduces backlash of the driving plate 10, 110, 210 in the housing 12; and prevents appearances of wear. Also, the teeth 14, 16, 116, 216 lock, and separation of the teeth 14, 16, 116, 216 from each other when the loads are changing is prevented. And, the driving plate 10, 110, 210 permits for simple bracing of the external teeth 16, 116, 216 with the internal teeth 14 and can be simply manufactured in the form of a stamped sheet-metal part. Furthermore, any clattering noises can be completely suppressed when the clutch system is running at an idle. In addition, a normal operation of the clutch system is possible that is low in losses and low in wear.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A driving plate for a multi-plate clutch system, said clutch system including a housing having a plurality of internal teeth, said driving plate comprising:

a plurality of external teeth adapted to be matingly engaged within corresponding internal teeth and disposed substantially equidistantly along the circumference of the driving plate, wherein at least one tooth of said plurality of external teeth is disposed offset in the circumferential direction from adjacent ones of said plurality of external teeth; and an assembly aid for matingly disposing said plurality of external teeth within the corresponding internal teeth, wherein said assembly aid includes an access opening defined by said at least one tooth and disposed substantially in a radial direction and an access opening defined by one of said plurality of external teeth adjacent said at least one tooth and disposed substantially in a radial direction.

2. A driving plate for a multi-plate clutch system as set forth in claim 1, wherein a pushing force acts on said driving plate and said at least one tooth is disposed offset in the direction of the pushing force.

3. A driving plate for a multi-plate clutch system as set forth in claim 2, wherein said at least one tooth extends from said driving plate so as to be elastic in the circumferential direction.

4. A driving plate for a multi-plate clutch system as set forth in claim 3, wherein said driving plate further includes at least one indentation disposed radially therein and separating said at least one tooth from adjacent said plurality of external teeth.

5. A driving plate for a multi-plate clutch system as set forth in claim 3, wherein said plurality of external teeth are matingly engaged within the corresponding internal teeth to create pretensioning therebetween to support an idling alternating moment of force.

6. A driving plate for a multi-plate clutch system as set forth in claim 3, wherein the internal teeth include flanks and said plurality of external teeth include flanks that are substantially tightly fitted on corresponding flanks of the corresponding internal teeth when the moment of pushing force is greater than the portion of the moment of pushing force when the clutch system is operating at an idle.

7. A driving plate for a multi-plate clutch system as set forth in claim 1, wherein said at least one tooth is disposed offset by at least a distance of a maximum circumferential backlash.

8. A driving plate for a multi-plate clutch system, said clutch system including a housing having a plurality of internal teeth, said driving plate comprising:

a plurality of external teeth adapted to be matingly engaged within corresponding internal teeth and disposed substantially equidistantly along the circumference of the driving plate, wherein a flat spiral spring is disposed offset in non-contacting circumferential relationship from adjacent ones of said plurality of external teeth.

9. A driving plate for a multi-plate clutch system, said clutch system including a housing having a plurality of internal teeth, said driving plate comprising:

a plurality of external teeth adapted to be matingly engaged within corresponding internal teeth and disposed substantially equidistantly along the circumference of the driving plate, wherein a leaf spring is disposed offset in non-contacting circumferential relationship from adjacent ones of said plurality of external teeth.

* * * * *